United States Patent [19]

Farrell et al.

[11] 4,002,565
[45] Jan. 11, 1977

[54] WASTE-WATER PROCESS

[75] Inventors: Thomas R. Farrell, El Sobrante; Robert J. Klett, San Francisco; James A. Craig, San Rafael, all of Calif.

[73] Assignee: Chevron Research Company, San Francisco, Calif.

[22] Filed: Aug. 25, 1975

[21] Appl. No.: 607,309

[52] U.S. Cl. .............................. 210/60; 210/73 R; 55/70; 55/73; 48/210

[51] Int. Cl.² ........................................ B01D 3/06

[58] Field of Search ................ 210/59, 60, 73 R; 55/70, 55, 73; 201/45; 203/42; 48/210, 206, 197; 423/220, 237, 238; 260/701, 674 R

[56] References Cited

UNITED STATES PATENTS

| | | | |
|---|---|---|---|
| 3,335,071 | 8/1967 | Bollen et al. ..................... | 55/70 |
| 3,518,166 | 6/1970 | Klett ................................ | 55/55 |
| 3,518,167 | 6/1970 | Klett ................................ | 55/55 |
| 3,698,882 | 10/1972 | Garrett et al. .................. | 48/210 |
| 3,846,096 | 11/1974 | Mallan et al. .................. | 48/210 |

OTHER PUBLICATIONS

Klett R. J.; "Treat Sour Water for Profit"; Hydrocarbon Processing; Oct. 1972, pp. 97–99.

*Primary Examiner*—Thomas G. Wyse
*Assistant Examiner*—Benoit Castel
*Attorney, Agent, or Firm*—G. F. Magdeburger; R. H. Davies; D. L. Hagmann

[57] ABSTRACT

Waste water containing dissolved acid-gas and ammonia impurities is processed for the separate recovery of the acid gas, ammonia and recycle water. In a further aspect, a purified pyrolysis gas is produced by treating a raw pyrolysis gas product stream utilizing the aforementioned recycle water and a pair of coupled acid-gas-absorber and acid-gas-stripper columns.

8 Claims, 2 Drawing Figures

WASTE-WATER PROCESS

FIELD OF THE INVENTION

This invention relates to a process for the separation of ammonia and acid gas from waste water. More particularly, it relates to a process for the aforementioned separation from waste water obtained by quenching and washing a pyrolysis gas and for the production of recycle water.

BACKGROUND OF THE INVENTION

The production of a waste-water by-product stream which contains ammonia and an acid gas is a common problem in the processing art. The problem lies in the disposal of the stream in an efficient manner whereby noxious materials are not vented into the environment and at the same time costs are kept at a reasonable level. Frequently there is another problem, depending upon location, which is the matter of availability of suitable process water. Especially in the petroleum refining and chemical industries, where large volumes of fresh process water are normally required and large volumes of waste water and by-product streams are produced, are these problems onerous.

In the developing field of fuel gas generation from the pyrolysis of organic and/or carbonaceous solids, efficient waste-water disposal is of particular importance. Suitable raw materials frequently contain sulfur and nitrogen in some form. In the pyrolysis the sulfur is converted to hydrogen sulfide and/or sulfur dioxide, and at least some of the nitrogen is converted to ammonia. A large amount of process water is required to quench the pyrolysis gas and to remove most, if not all, of the sulfur-containing acid gas and ammonia.

Conventional methods known in the art for handling waste-water streams suffer from a number of disadvantages: (1) in general, the size of the units employed is such that the capital cost outlays required for their use is excessive; (2) usually there is such a substantial requirement for high-pressure steam that the operating cost outlay is also excessive; and (3) low-energy heat values are lost or inefficiently utilized, thereby contributing to pollution (heat).

THE INVENTION

The present invention relates to a process for the separation of acid gas and ammonia from waste water and for the production of recycle water, comprising the steps:

1. producing a first recycle water stream and an effluent gas stream comprising acid gas, ammonia and water vapor by passing said waste water into an acid gas-ammonia stripping column, said column being maintained at a bottoms temperature in the range from about 93° to 149° C, preferably 115° to 132° C, and at a pressure in the range from about 1 to 5 atmospheres absolute;

2. separately withdrawing said first recycle water stream and said effluent gas stream from said acid gas-ammonia stripping column;

3. producing a liquid aqueous concentrate of ammonia and acid gas by decreasing the temperature of said effluent gas stream, said temperature decrease being an amount in the range from about 55° to 110° C.

4. producing an effluent acid-gas stream and an aqueous bottoms stream by passing said concentrate into a primary acid-gas-stripping column, said column being maintained at super-atmospheric pressure acid-gas stripping conditions;

5. separately withdrawing said acid-gas stream and said bottoms stream from said acid-gas stripping column; and 6. producing an effluent gas stream comprising ammonia and a second recycle water stream by passing said bottoms stream into an ammonia stripping column, said column being maintained at superatmospheric pressure ammonia stripping conditions.

In a further aspect of the invention, waste water and a scrubbed pyrolysis gas are generated by scrubbing a raw pyrolysis gas with at least a portion of the aforementioned first recycle water stream obtained from the acid gas-ammonia concentration stage. Optionally, a portion of the bottoms from the primary acid-gas-stripping column is added to the first recycle water stream prior to its use as scrubbing (quench) water for the crude pyrolysis gas.

In a still further aspect of the invention, a clean pyrolysis gas is obtained by treating the aforementioned scrubbed pyrolysis gas by subjecting this gas to the integrated action of a pair of coupled acid-gas-scrubbing and acid-gas-stripping columns (see encircled portion of FIG. I) followed by water wash for the removal of residual ammonia.

In a preferred embodiment of the present invention, hot raw pyrolysis gas obtained by pyrolyzing coal is converted to clean pyrolysis gas substantially free of acid gas and ammonia by employing the present process for the processing of the raw pyrolysis gas.

By "waste water" as used herein is meant by definition water which contains an appreciable amount of impurity comprising acid gas and ammonia.

By the term "acid gas" as used herein is meant at least one gas selected from the group consisting of hydrogen sulfide, carbon dioxide, carbonyl sulfide, hydrogen cyanide and sulfur dioxide. Preferably the acid gas is in the main a mixture of hydrogen sulfide and carbon dioxide. By "coupled acid-gas-absorber and acid-gas-stripper columns" as used herein is meant by definition that at least a portion of the aqueous bottoms of the acid-gas-stripper column is used as the scrubbing liquid for the acid-gas-absorber column and at least a portion of the acid-gas-scrubbing column bottoms effluent is used as the liquid feed to the acid-gas-scrubber column. (See encircled dotted portion of FIG. I).

The water produced as a bottoms product stream from the concentration stage or as one of the product streams from the ammonia-stripping stage in the present process is of much higher purity in terms of acid gas and ammonia content than the waste water used as feed herein. It is, in general, suitable for use or reuse as process wash water, and accordingly is "recycle water." For practical purposes, recycle water should have an acid gas and ammonia content, weight percent based upon water, which is less than 15%, preferably less than about 2%, of the corresponding content of the waste water feed to the process.

DESCRIPTION OF THE DRAWING

FIG. I is a schematic process flow diagram illustrating a preferred embodiment of the present invention.

FIG. II is an alternate design for the concentrator sub-system.

DETAILED DESCRIPTION OF THE INVENTION

Figure 1:
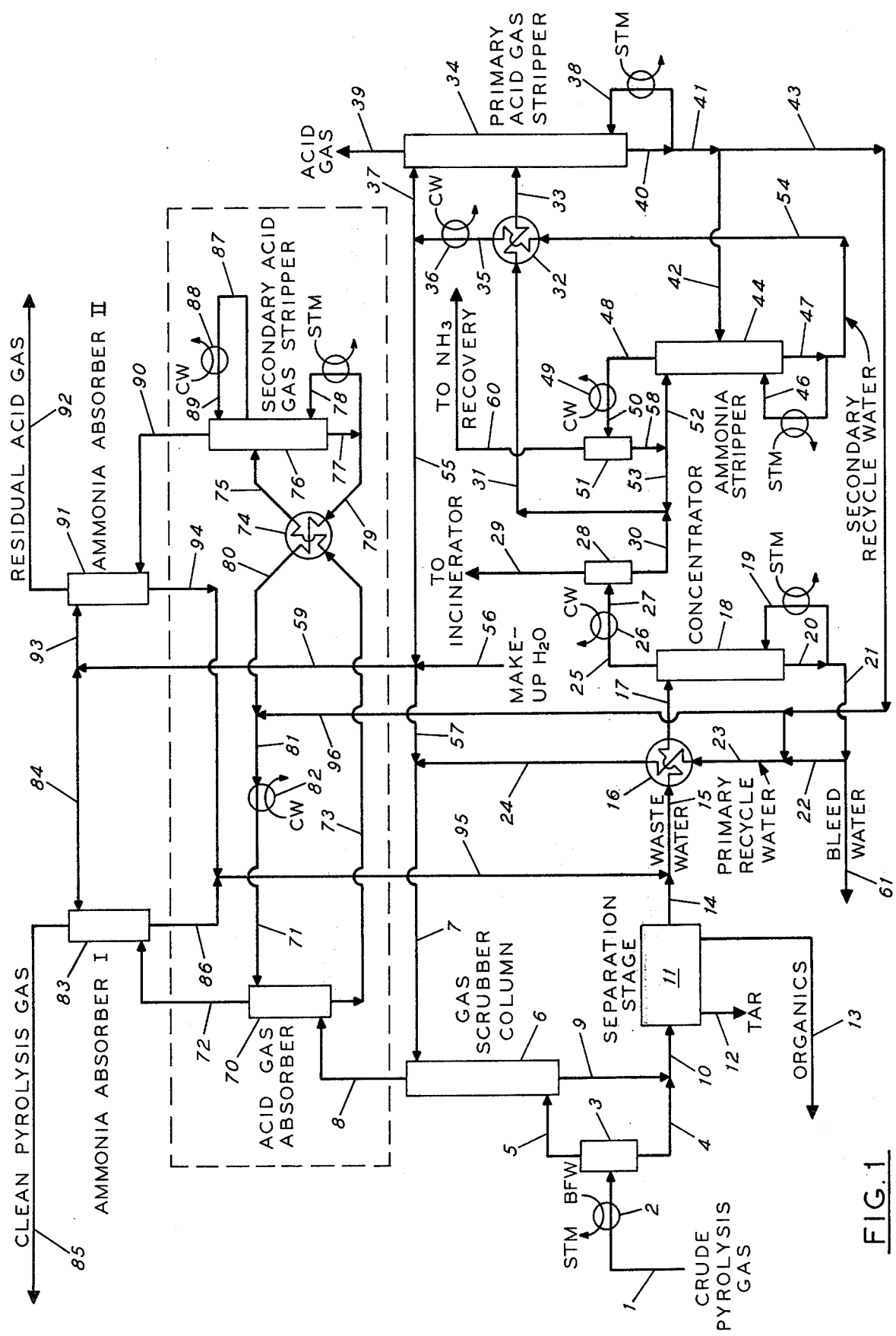
Figure 2:
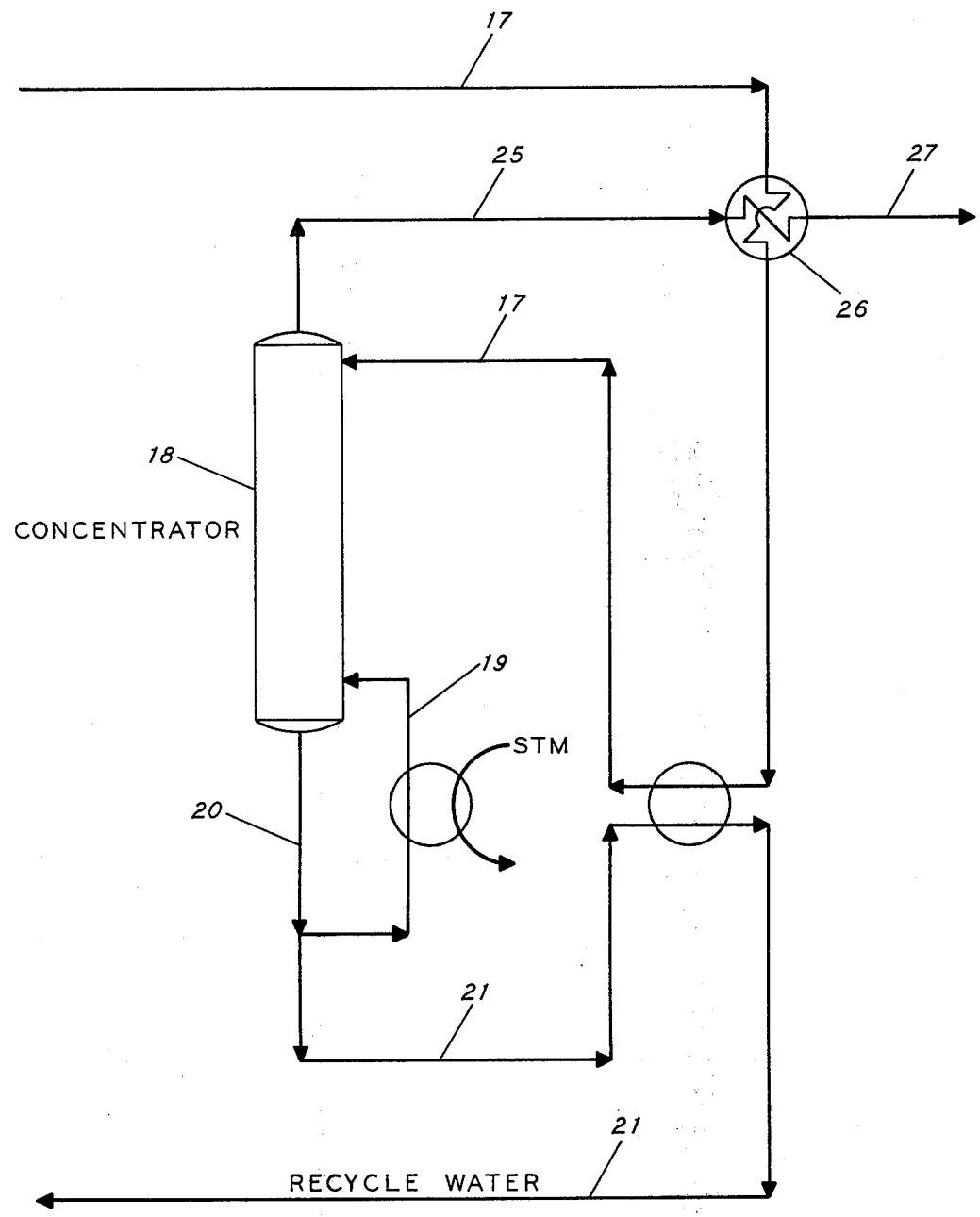

Referring more particularly to FIG. I, a raw, hot pyrolysis gas obtained from the pyrolysis of coal, for example by the well-known Lurgi coal gasification process, is introduced via line 1 to waste heat boiler 2 where boiler feed water is converted to low-pressure steam by indirect heat exchange with the crude pyrolysis gas. The resulting cooled pyrolysis gas is delivered to gas-liquid separator 3 where condensate, including waste water, tar and a minor amount of organic material, is separated from the pyrolysis gas and withdrawn from separator 3 via line 4. Via line 5 the cooled and condensate-free pyrolysis gas is delivered to gas scrubber column 6.

Depending in the main upon the bound sulfur and nitrogen content of the coal used as feed to the pyrolysis stage, the pyrolysis gas contains as impurity a mixture of ammonia and weak acid gas, mainly $H_2S$ and $CO_2$. Usually the mol ratio of weak acid gas to ammonia is greater than 1. Therefore, it is desirable that recycle water used to scrub the cooled pyrolysis gas contain added ammonia, for example by addition to the recycle water of a portion of ammonia-rich bottoms from an acid-gas-stripper column in order that the acid-gas content of the scrubbed pyrolysis gas be minimized. Optionally, the gas-scrubber column 6 is operated with the acid gas to ammonia mol ratio in the range 0.2 to 2, preferably about 0.75 and with the column at the highest pressure available, the scrubbed gas exiting from the column at about 120° F (49° C). Therefore, the wash water introduced to column 6 via line 7 desirably contains recycled ammonia sufficient to provide a suitable acid gas to ammonia ratio.

Via line 8 scrubbed pyrolysis gas at about 120° F (49° C) is withdrawn from column 6. This gas still contains a minor amount of acid gas and a relatively smaller amount of ammonia. It is suitable for use for many purposes. In the event a clean pyrolysis gas is required, for example as a feed to a methanator stage for the conversion to methane of CO and $H_2$ present in the pyrolysis gas, the scrubbed pyrolysis gas withdrawn from column 6 must be further processed as described below.

The waste water produced by the gas scrubbing in column 6 contains tar, organics and fly ash, and is withdrawn via line 9 and passed together with the condensate in line 4 to separation stage 11, where the tar, fly ash and organics (organic pyrolysis products, phenolics and the like) are separated from the waste water by known methods and withdrawn via lines 12 and 13 for use as fuel or for the recovery of valuable by-products, also by known methods. The separated waste water containing in large part the acid gas and ammonia which was present in the crude pyrolysis product is withdrawn from separation stage 11 via line 14.

Coal pyrolysis gas is a mixture of hydrogen, carbon monoxide and carbon dioxide and, depending upon the particular feed coal used, contains variable amounts of hydrogen sulfide and ammonia, together with some organics and tar. In the water washing and treatment described above, most of the ammonia and acid gas is removed from the pyrolysis gas with the result that a relatively dilute waste-water stream is produced which contains ammonia and acid gas scrubbed from the pyrolysis gas. For effective and efficient handling and disposition of this waste-water stream, the acid-gas component must be separated from the ammonia and the water must be upgraded to the point at least that it is suitable for use as recycle water or is suitable with little or no additional processing for discharge to the environment. It has been found that a more efficient separation of ammonia from acid-gas components can be achieved provided that the dilute waste-water stream is converted to a concentrated waste-water stream in which the concentration effect relates to the combined ammonia and acid-gas components. To this end, the combined waste-water effluent stream from separation stage 11 and ammonia absorbers 82 and 90 is delivered to concentrator 18 via lines 14 and 15, heat exchanger 16 and line 17. In heat exchanger 16 the waste water is heated to about 150°–250° F (65° to 121° C) by indirect heat exchange with recycle water delivered to exchanger 16 via line 22.

Concentrator 18 is maintained at a temperature in the range 200° to 300° F (93° to 149° C), a bottoms temperature of about 250° F (121° C), and a pressure in the range 1 to 5 atmospheres absolute, which conditions permit the effective use of low-pressure steam obtained, for example, from waste heat boiler 2, and similar low-pressure steam generating units (not shown) of the process. Reboiler unit 19 is used to maintain substantial boilup in concentrator 18. The bottoms liquid from unit 18 is withdrawn via line 20 and in the main is recycled to the process via lines 21–24. A minor bleed stream sufficient to prevent an undesirable buildup of dissolved salts of strong acids and bases, for example sodium chloride or sulfate, is withdrawn from the process via line 59 for delivery to secondary treatment and disposition.

Via line 25 a mixture of ammonia, acid gas and water vapor is withdrawn from concentrator 18 and passed to heat exchanger 26 where it is cooled to a temperature in the range from about 10° to 65° C (50° to 150° F) and sufficient to produce a liquid condensate of the mixture which is withdrawn from exchanger 26 via line 27 and passed to liquid gas separator 28. Via line 29 separated gas is withdrawn from 28 and passed to an incinerator for disposal and via lines 30 and 31, heat exchanger 32 and line 33 the liquid condensate is passed to primary acid-gas-stripper 34. For the stable operation of acid-gas stripper 34, it is necessary that the effluent vapor stream from concentrator 18 be converted to liquid condensate.

For efficient separate recovery of acid gas and ammonia, a stripping distillation is carried out at superatmospheric pressures in interconnected distillation columns in accordance with the process described in U.S. Pat. No. 3,335,071, which is hereby referred to and incorporated herein by reference. Thus, waste water concentrate is withdrawn from separator 28 and combined with a recycled concentrate solution in line 53 to form a combined feed in line 31 which is preheated by heat exchanger 32 and then introduced via line 33 into acid-gas-stripper column 34 at about 93°–150° C (200°–300° F). The concentrated solution in line 53 is about 50 weight percent ammonia, with about 2 to 4 parts (weight) of ammonia to 1 part of acid gas, and with the balance $H_2O$. Column 34 operates at about 4 to 20 atmospheres (60 to 300 psia) with a bottoms temperature of 149° to 204° C (300° to 400° F), which is maintained with substantial boilup by reboiler 38.

The stripped bottoms liquid of column 34 withdrawn through line 40 contains about 4 to 15 parts of $NH_3$ to 1 part of weak acid gas. From the top of column 34 overhead vapors of acid gas and containing only about 0.1 weight percent water and less than 250 ppm $NH_3$ are withdrawn via line 39 at about 38° C (100° F). This temperature and composition is achieved by introducing into the top of column 34 recycle water via line 37 which has been cooled to prevent carry-over of water and ammonia to about 38° C (100° F) by interaction with heat exchanger 36.

The stripped bottoms liquid in line 40 is introduced into ammonia stripper column 44 at about 121°–149° C (250°–300° F). Column 44 operates at a pressure of about 15 to 105 psig (2 to 8 atmospheres) and at a bottoms temperature of 121°–177° C (250°–350° F), which is maintained with substantial boil-up by cycling a portion of the bottoms via line 47 through reboiler 46. The bottoms product of column 44 contains about 5 to 100 ppm by weight $H_2S$ and about 50 to 300 ppm by weight $NH_3$, and is withdrawn via line 47 and recycled as secondary recycle water to the process after passage through heat exchangers 32 and 36 as a premium recycle water via lines 47, 54, 35, 37 and 55, as shown.

Column 44 yields an overhead $NH_3$-enriched vapor which can be partially condensed to provide high-purity $NH_3$ as the uncondensed portion. This is accomplished by refluxing through lines 58 and 52 a solution of the same concentration as that separated in liquid-gas separator 51. This reflux solution is provided at a temperature of 27° to 70° C (80° to 160° F), and serves to condense water from the upflowing vapors rising above the point of introduction of the stream in line 42. There is thus obtained overhead in line 48 at about 93° to 149° C (200° to 300° F) an enriched vapor which is about 40 to 60 weight percent $NH_3$. When cooled by passage through heat exchanger 49, most of the material condenses and is collected in separator 51. This condensate is withdrawn via line 58 partly for reflux via line 52 to column 44 and partly via line 53 for return to column 34. The uncondensed portion is predominantly $NH_3$ and contains about 1 to 3 weight percent $H_2O$ and 0.5 to 3 weight percent $H_2S$ and is withdrawn via line 60 for further processing or recovery, as desired.

In the event that a clean pyrolysis gas is desired, that is, a gas which for practical purposes is free of acid gas and ammonia, the effluent gas stream withdrawn from gas scrubber column 6 via line 8 is processed using a pair of coupled acid-gas-absorber and acid-gas-stripper columns operating at the highest pressure available. The gas in line 8, at a temperature of about 120° F (49° C) is passed to acid-gas-absorber 70, where it is scrubbed with an aqueous ammonia-rich scrubbing liquid introduced into unit 70 via line 71. The liquid prior to introduction is adjusted to a temperature of about 38° C (100° F) by passage through heat exchanger 81. It is at least a portion of the bottoms withdrawn via line 77 from secondary acid-gas-stripper 76 and passed via line 79 to heat exchanger 74 wherein it is cooled and withdrawn via line 80. The ammonia content of line 80 is maintained by addition of material via line 96. The pyrolysis gas resulting from the treatment in absorber 70 contains little or no acid gas and a minor amount of ammonia. The latter is removed by withdrawing this ammonia-containing pyrolysis gas from absorber 70 via line 72 and passing it to ammonia absorber 83, where it is washed with recycle water introduced to absorber 83 via line 84. Clean pyrolysis gas is withdrawn from unit 83 via line 85 for recovery or use as desired. The liquid wash bottoms withdrawn from unit 83 via line 86 are passed in recycle to the process via line 95.

The liquid bottoms produced in acid-gas-scrubber 70 are withdrawn via line 73 and passed via heat exchanger 74 and line 75 to secondary acid-gas-stripper column 76, which is operated under acid-gas-stripping conditions and which is fitted with a reboiler unit 78, by means of which constant boilup is maintained at a temperature of about 149°–204° C (300°–400° F) and with a reflux control unit, exchanger 88 and lines 87 and 89, whereby the temperature of the effluent weak acid gas stream from unit 76 via line 90 is maintained at about 38° C (100° F). The stream contains a minor amount of ammonia, which is removed by passing the stream to ammonia scrubber 91, where it is washed with recycle water introduced to absorber 91 via line 93. Via line 92, residual acid gas essentially free of ammonia is withdrawn from absorber 91 for recovery or use as desired.

The aqueous liquid bottoms from unit 91 are withdrawn via line 94 and passed in recycle via line 95 to the process.

Make-up water, if required, is introduced to the process via lines 55–57 and 59 and a bleed stream, as required to prevent build-up of minor impurities in the process streams, is withdrawn from the process via line 59.

Waste Water

Dilute waste water in general is advantageously treated by the present process, and the use of such as feeds for the process is contemplated. This combined concentration (weight percent based upon water) of the acid gas and ammonia solutes and the amount of ammonia relative to acid gas may vary widely. The combined concentration, in general, is desirably in the range 0.5 (an appreciable amount) to 10 weight percent, preferably 1 to 6 weight percent. For each mol of acid gas, the amount of ammonia will be in the range from about 0.7 to 2 mols and higher. Other impurities may be present in the waste water, particularly impurities which exhibit little or no vapor pressure under the conditions of the acid gas-ammonia concentration stage of the present invention, i.e., non-volatile impurities. Preferably as a practical matter, acid gas and ammonia are the only volatile impurities in the waste water.

Waste water suitable for use as feed herein may be obtained from a wide variety of sources. Representative examples include quench and/or wash water from treating flue gas, petroleum refinery effluent gas streams, refinery liquid hydrocarbon product streams, refinery fuel gas streams, coke oven gas, gasified coal, liquefied coal, shale oil, tar sands, or carbonaceous solids, and the like.

Concentration Stage

For effective and economical over-all processing of an acid-gas-containing and ammonia-containing pyrolysis gas, we have found that a concentration stage must be included in the process train when the primary quench water stream is dilute in ammonia (up to 2% by weight). Such a stage: (1) provides for use of heat ordinarily lost as waste heat; (2) provides a concentrated waste-water feed to the waste-water-treating train with a consequent and substantial economy of operation of this train; and (3) provides a useful recycle water stream and a consequent large reduction in the fresh process water requirements.

Of the variables involved in the concentration stage, pressure is found to be especially significant. It must be low enough to provide efficient stripping with low-pressure steam, yet high enough to ensure total condensation of the overhead mixture, i.e., water vapor, ammonia and acid gas, by ordinary cooling means and without compression. A pressure in the range from about 1 to 5, preferably from about 1.68 to 2.7, atmospheres absolute (10 to 25 psig) is in general satisfactory, although moderately higher and lower pressures may be used without unduly increasing operating costs.

Two other prime variables of the concentrator are the desired concentrations of the concentrator overhead and recycle water streams. The overhead concentration is adjusted by varying the feed temperature between 100° F and about 230° F (38° C to 110° C). The recycle water concentration is adjusted by varying the heat input to the reboiler. For desired values of overhead and recycle water concentrations, the following variables may be chosen to result in the most economical concentrator design pressure, number of contacting stages, reboiler heat input, and column feed temperature.

In general, under operation of the concentration stage under pressure and at bottoms temperatures described above, the resulting concentrate has an ammonia concentration in the range from about 3 to 10 weight percent of the concentrate and the resulting recycle water is of excellent quality.

Gas Scrubber Column

In a preferred aspect of the present invention, a dilute waste-water stream is generated by scrubbing a raw pyrolysis gas with recycle water. In this, it is desirable that the scrubber column be operated in a manner to conserve the pressure of the raw pyrolysis gas in order to facilitate residual acid-gas absorption in a down-stream secondary cleanup of the resulting scrubbed pyrolysis gas. To this end, a pressure of at least 4.4 atmospheres absolute (50 psig) is required for the effluent gas stream from the scrubber column, and preferably this pressure should be at least 5.8 atmospheres absolute (70 psig).

In addition to the foregoing and where the efficient production of a clean pyrolysis gas is the objective, the scrubber column must be operated to have an acid gas to ammonia mol ratio for the scrubber column system (i.e., ratio of the sum of the mols of acid gas in the feed and recycle scrub water delivered to the column per unit time to the sum of the mols of ammonia in the feed and recycle scrub water delivered to the column per unit time) in the range from about 0.2 to 2, preferably 0.65 to 1. A satisfactory ratio is normally attained by control of the relative amount of primary acid-gas-stripper bottoms recycled to the gas scrubber column. Optionally, and if desired, use may be made of at least a portion of the ammonia product stream or any other suitable ammonia source in order to achieve the desired mol ratio for the scrubber column.

Acid-Gas and Ammonia-Stripper Columns

The conditions required for operation of the stripper columns of the present process are superatmospheric pressure acid-gas or ammonia stripping conditions normally known and employed (see U.S. Pat. No. 3,335,071 noted above).

Briefly, a relatively high temperature range must be employed in the acid-gas stripper columns because the dissociation of acid gas-ammonia salts is increasingly favored as the temperature is increased. On the other hand, the temperature must be low enough to reboil with reasonable pressure steam. A stripper column bottoms temperature in the range 149° to 204° C (300° to 400° F) is, in general, satisfactory. On the other hand, the stripper column overhead temperature must be low enough to insure little or no ammonia is carried along in the acid-gas effluent stream in order to avoid contamination of the stream and to avoid plugging of the downstream overhead lines by solid ammonium acid-gas salts. Usually a satisfactory overhead (reflux) temperature for the acid-gas stripper is in the range 27° to 49° C (80° to 120° F).

A third consideration in the operation of the acid-gas stripper column relates to the temperature of the liquid feed stream to the column. This temperature should be in the range 93° to 149° C (200° to 300° F) for efficient operation. In any event, this feed temperature must be low enough to prevent flashing of the waste-water feed.

In the case of the ammonia stripper column operation, the pressure should be in the range 3 to 8.1 atmospheres absolute (30 to 105 psig). The feed to the column is substantially that of the bottoms withdrawn from the acid-gas-stripper column as it is the feed to the ammonia-stripper column, i.e., for efficient operation and the bottoms temperature is determined by the pressure employed and the desired effluent bottoms water quality. Usually a satisfactory bottoms temperature is in the range 121° to 177° C (250° to 350° F).

What is claimed is:

1. A process for separating acid gas and ammonia from waste water having an appreciable content thereof and for the production of recycle water, comprising the steps:
  1. producing a first recycle water stream and an effluent gas stream comprising acid gas, ammonia and water vapor by passing said waste water into an acid gas-ammonia stripping column, said column being maintained at a bottoms temperature in the range from about 93° to 149° C and at a pressure in the range from about 1 to 5 atmospheres absolute, said first stream having an acid gas and ammonia content which is less than 15 percent of the content thereof for said waste water;
  2. separately withdrawing said first recycle water stream and said effluent gas stream from said acid-gas ammonia stripping column;
  3. Producing a liquid aqueous concentrate of ammonia and acid gas by decreasing the temperature of said effluent gas stream, said temperature decrease being an amount in the range from about 55° to 110° C.
  4. producing an effluent acid-gas stream and an aqueous bottoms stream by passing said concentrate into a primary acid-gas stripping column, said column being maintained at superatmospheric pressure acid-gas stripping conditions;
  5. separately withdrawing said acid-gas stream and said bottoms stream from said acid-gas stripping column; and
  6. producing an effluent gas stream comprising ammonia and a second recycle water stream by passing said bottoms stream into an ammonia stripping column, said column being maintained at superatmospheric pressure ammonia stripping conditions, said second stream having an acid gas and ammonia content which is less than 15 percent of the content thereof for said bottoms stream from said acid-gas stripping column.

2. A process as in claim 1 characterized in that said waste water and a scrubbed pyrolysis gas are generated by scrubbing a raw pyrolysis gas with at least a portion of said first recycle water stream.

3. A process as in claim 2 characterized in that a portion of said bottoms from the primary acid-gas-stripping column is added to said first recycle stream prior to said scrubbing.

4. A process as in claim 2 characterized in that said pyrolysis gas is obtained by pyrolyzing coal.

5. A process as in claim 4 characterized in that (1) said scrubbed pyrolysis gas is obtained by passing crude pyrolysis gas to a gas scrubber column, scrubbing said crude gas with said recycle water, said scrubber column being operated at an acid gas-to-ammonia mol ratio in the range 0.2 to 2, withdrawing the resulting scrubbed gas at a temperature of about 49° C and at a pressure of at least 4.4 atmospheres absolute, and (2) said acid gas-ammonia stripping column is maintained at a temperature in the range 115° C to 132° C and at a pressure in the range from about 1.68 to 2.7 atmospheres absolute.

6. A process as in claim 5 characterized in that said acid gas-to-ammonia mol ratio is in the range 0.65 to 1.5 and said resulting scrubbed gas pressure is at least 5.8 atmospheres absolute.

7. A process as in claim 2 characterized in that said acid gas comprises a mixture of hydrogen sulfide and carbon dioxide.

8. A process as in claim 2 characterized in that said acid-gas and ammonia contents for said first and second recycle stream is less than 2 percent of said waste water and bottoms stream from said acid-gas stripping column, respectively.

* * * * *